United States Patent [19]

Ronc

[11] 4,201,193
[45] May 6, 1980

[54] SOLAR ENERGY ABSORBING ROOF

[75] Inventor: Michel Ronc, St-Priest, France

[73] Assignee: Elf Union, Paris, France

[21] Appl. No.: 887,938

[22] Filed: Mar. 17, 1978

[30] Foreign Application Priority Data

Mar. 18, 1977 [FR] France ............................... 77 08152

[51] Int. Cl.$^2$ ............................................. I24J 3/02
[52] U.S. Cl. ..................................... 126/448; 126/447; 126/901; 165/133; 165/134 R; 165/172
[58] Field of Search ............... 237/1 A; 126/270, 271, 126/418, 448, 449, 901; 165/133, 134, 172

[56] References Cited

U.S. PATENT DOCUMENTS

| 3,270,739 | 9/1966 | Thomason | 126/271 |
|---|---|---|---|
| 3,399,664 | 9/1968 | Suhay | 126/271 |
| 3,980,071 | 3/1974 | Barber | 126/271 |
| 4,005,698 | 2/1977 | Cuomo | 216/400 |
| 4,010,733 | 3/1977 | Moore | 126/271 |
| 4,011,190 | 3/1977 | Telkes | 126/271 |
| 4,015,582 | 4/1977 | Liu | 126/271 |
| 4,043,317 | 8/1977 | Scharfman | 126/270 |
| 4,046,135 | 9/1977 | Root et al. | 126/271 |
| 4,052,001 | 10/1977 | Vogt | 126/271 |
| 4,055,162 | 10/1977 | Gonzalez | 126/271 |
| 4,064,866 | 12/1977 | Knight | 126/271 |
| 4,099,517 | 7/1978 | McRae | 126/271 |
| 4,102,327 | 7/1978 | Thomason | 126/271 |
| 4,103,493 | 8/1978 | Schoenfelder | 126/271 |
| 4,117,682 | 10/1978 | Smith | 126/271 |
| 4,117,829 | 10/1978 | Gross | 126/271 |
| 4,123,003 | 10/1978 | Winston | 237/1 A |

Primary Examiner—James C. Yeung
Assistant Examiner—Daniel J. O'Connor
Attorney, Agent, or Firm—Bacon & Thomas

[57] ABSTRACT

A roof structure has a supporting base on which a layer of insulating material is placed and over which is a metal layer having water circulating channels. The metal layer is covered by a water proofing layer, the outer surface of which is covered with mineral particles. The roof structure serves both the function of a conventional roof and a solar energy collector.

4 Claims, 9 Drawing Figures

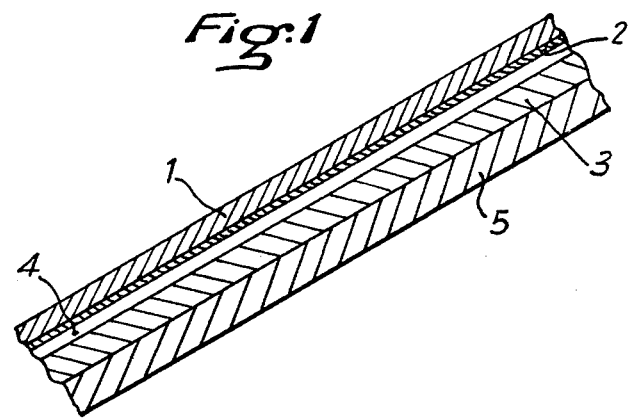
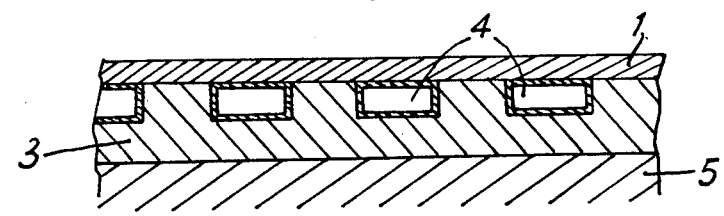
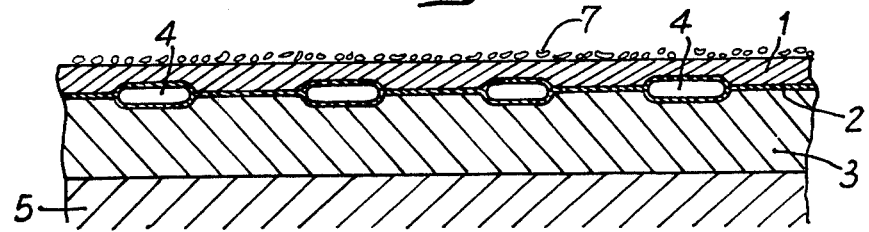
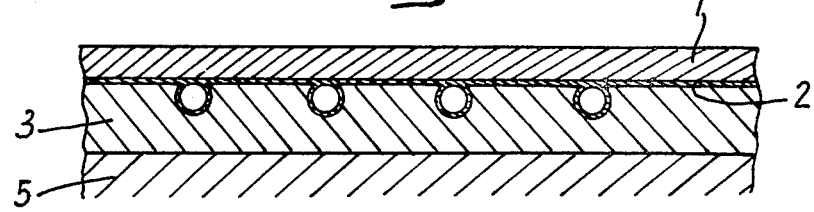

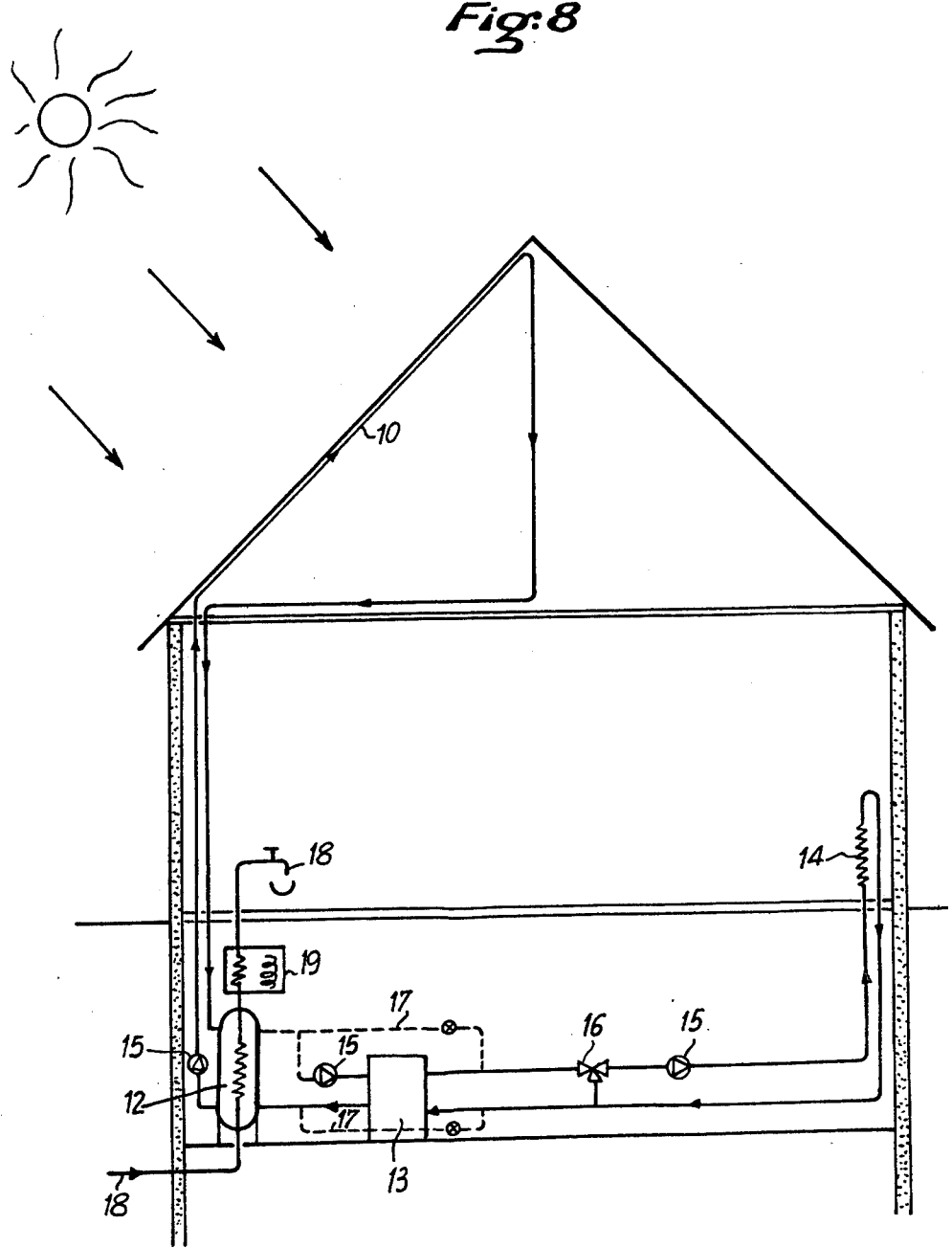

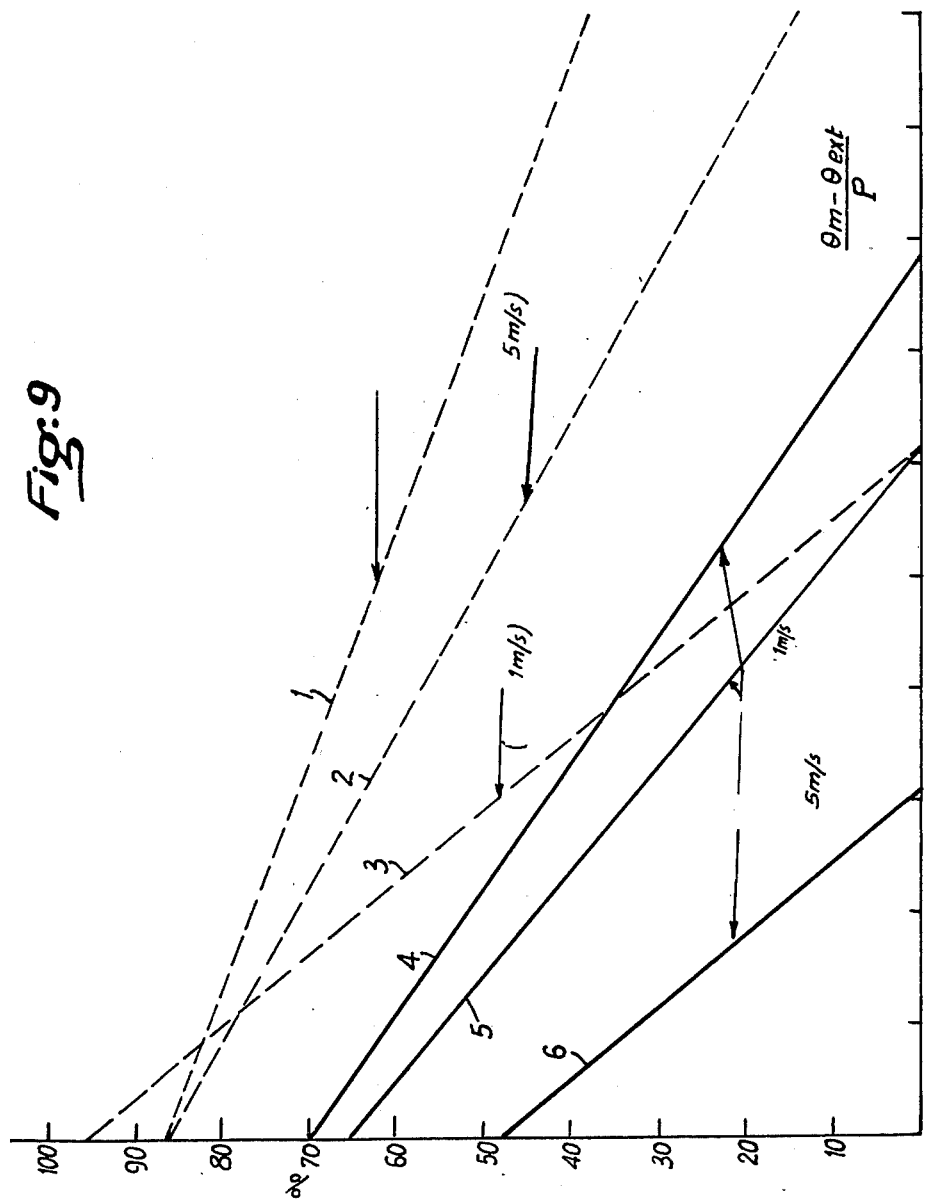

SOLAR ENERGY ABSORBING ROOF

The application of solar energy to the production of domestic hot water and to heat water for swimming-pools is beginning to become economically feasible, with the development of modular flat heat collecting panel technology. The use of solar energy for domestic heating still raises considerable problems, largely connected with the high cost of the equipement required and of its installation, as well as the difficulty of integration with the architecture.

This invention concerns an improved solar roofing structure, combining the covering and waterproofing functions of a conventional roof with the functions of solar energy collecting-panels, that can be used for heating or air-conditioning of industrial premises or private houses, and/or domestic hot water production.

In winter, particularly in the months of January and February, the average amount of solar energy reaching on roof constructed at an angle of 45° and facing south, in central France, is 3 to 4 kWh/m$^2$. These are average figures, and considerable differences occur depending on whether days are sunny, overcast, or rainy. On the frequent occasions when there are broken clouds, the flow of solar energy is subject to very large variations, often occurring very quickly. The solar roofing must therefore have a low thermal inertia, so that it can collect or recover the maximum amount of heat produced by the sun rays whenever atmospheric conditions permit the energy flow to rise above the energy level at which it can be converted into effective heat transferable by the fluid in the circuit. For water, for instance, the minimum temperature for direct use for heating is approximately 35° C.

The purpose of this new solar roofing structure is:
- in winter, to recover part of the heat produced by the sun's rays on the roof and convey it by means of a heat-carrying liquid fluid, for use in heating premises or possibly a domestic water supply;
- in summer, possibly to cool the roof by using the heat-carrying fluid to remove the heat produced by the sun's rays, and use part of it for domestic hot water requirements.

To obtain this air-conditioning and heat-recovery effect, channels in which liquid circulates are installed in direct contact with the waterproofing layer of the roof.

It will be easier to understand the invention from the following description of one of its possible embodiments, illustrated by the accompanying figures:

FIG. 1 shows a longitudinal section along the pitch of the solar roof.

FIG. 2 shows a cross-section of the solar roof with water-circulation channels consisting of structural pipes with a rectangular section.

FIG. 3 shows a cross-section of a roof with the water circuit incorporated in a sheet of metal (e.g. rolled aluminium).

FIG. 4 shows a variant of FIG. 3, in which the metal sheet and circulating channels form part of the shaped profile structure (e.g. aluminium).

FIG. 8 shows an example of installation in a house.

FIG. 9 is a graph plotting energy recovery efficiency values for solar roof structures in relation to a variable.

Figure 5:
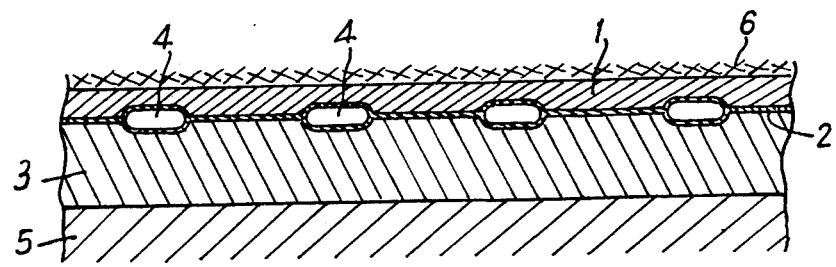
FIG. 5 shows a variant of FIG. 3, with fibre provided on the outer surface.

FIG. 1 shows, beginning on the outside, a waterproofing layer 1, in contact with a metal sheet 2, a heat-carrying liquid circuit 4, incorporated or not, an insulating layer 3, and a base 5.

The waterproofing layer 1 is made from a material selected from the group comprising elastomers, or from bitumen. This waterproof surface must be heat-absorbent, and have an attractive appearance. This is obtained with the mineral particles normally used to cover bitumen shingles, and with the colours ochre, brown, red or green which, if dark enough, usually have high enough absorbency.

The channels 4 in which the liquid (water) circulates may be pipes or sections (FIG. 2). They are preferably attached to, or part of, a metal plate or sheet (FIG. 3). An insulating layer 3 beneath the pipes and metal sheet provides heat insulation. The insulating material is selected from the group comprising fibres, cellular materials, sheets, pellets or mineral or organic wool.

The channels 4 are preferably parallel to the most steeply pitched line of the roof, to allow circulation by natural convection.

Larger pipes at each end of the circulation channels supply and remove the heat-carrying fluid.

To give the whole structure the least possible heat inertia, which is an important factor in efficiency, the volume of the circulation pipes is as small as possible. The aim is to have a large number of channels of small section, the limiting factor being loss of head.

Channels forming part of a sheet of metal can be obtained by the technique by which hydraulic circuits incorporated in a sheet of aluminium 2 to 3 mm thick (as in FIG. 3) are produced by rolling or by extrusion.

Extrusion of aluminium is another suitable method. The sheet and circulating channels form a single extruded unit.

The supporting structure 5 may be of wood, steel or concrete, and its pitch should comply with architectural criteria, and with the need to optimalize recovery of heat produced by the sun's rays in winter (at French latitudes, maximum recovery in winter is obtained with a roof facing south and pitched at about 50° or 60°).

Obviously, this type of solar roof is not so effective as a solar panel using the hothouse effect. On the other hand, the possiblity of covering whole roofs, and in general of constructing large areas at reduced extra cost more than compensates for any loss in performance. This basic system makes maximum use of materials normally employed for roofing and waterproofing coverings. Its energy-recovery function can be further improved by paying attention to wind protection, the surface condition of the outside layer of the roof, and resistance to heat transfer between the outer surface and the heat-carrying fluid.

To reduce the serious effect of wind, the roof can be covered with a fibrous mat 6, consisting of non-woven polyester, nylon or other fibre. This matting is open enough to allow the sun's rays to penetrate, while preventing the wind from blowing over the absorbent surface, a major source of heat loss through convection. FIG. 5 illustrates this variant.

Figure 6:
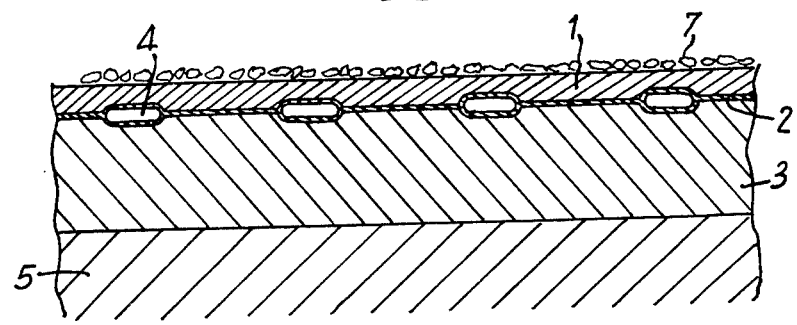
FIG. 6 shows a variant of FIG. 3, in which the waterproofing layer is covered with gravel or glass or ceramic particles.

To prevent aging of the bitumen often used for the waterproofing material, it is customary to cover shingles with mineral particles (slate chips or "ceramic" particles, as shown in FIGS. 3 and 6). These particles 7 also allow the colour and appearance of the roof to be varied. Replacement of these particles by glass chips, a few millimeters in size, creates a hothouse effect, since the glass transmits approximately 85% of the visible, close infra-red rays, while being opaque to the more remote infra-red rays emitted by the hot absorbent surface beneath the chips. This effect, while naturally less efficient than in standard solar heating panels, particularly because of the absence of the air blade, is nevertheless quite appreciable.

Figure 7:
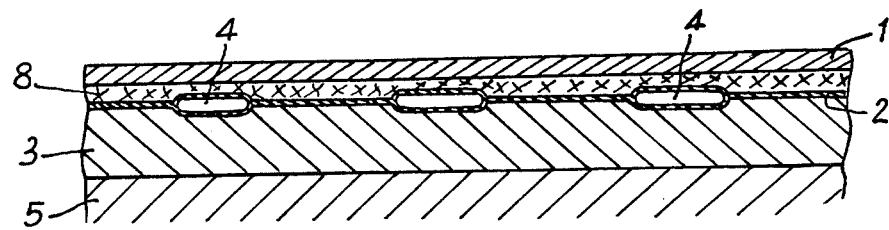
FIG. 7 shows a variant of FIG. 3 in which the conductibility of the waterproofing layer is increased by a filler layer of conducting metal powder or fibres.

To increase the heat-transfer coefficient between the outside surface and the heat-carrying fluid, the conductivity of the waterproofing layer can be increased by mixing the bitumen or elastomer with carbon, metal powder or any other substance capable of increasing conductivity. Metal fibres can also be sunk in the waterprofing material (FIG. 7).

As shown in FIG. 8, the heating system accompanying a solar roof 10 comprises mainly:
- a storage tank 12 to provide the system with some heat inertia, and provide against periods without sunshine; this may be an ordinary water tank;
- heating devices 14, preferably radiators with a large heat-transmission area, low-temperature convectors and underfloor heating;
- circulating pumps 15;
- a system for regulating the distribution circuit, such as a three-way valve 16;
- a system for regulating the solar circuit, starting up circulation when the temperature at the solar roof outlet is higher than the temperature in the storage tank, and halting it when the opposite is the case;
- preferably, a heat pump 13 between the storage tank and distribution system, which, by permitting the solar roof system to function at low temperatures (10° to 30° C.), gives the whole system a high enough efficiency in relation to the incidence of solar energy to cover all heating needs at French latitudes; there is also a regulation system 17 to bypass the heat pump in spring and autumn, when climatic conditions are favourable enough.

In summer, the system is used to heat the domestic hot water supply 18, with a conventional supplementary heater 19.

The heat pump then is no longer in operation, and the 10 kWh or so needed daily are provided by the roof structure.

The excess surface area is compensated for by a marked rise in the operating temperature, which reduces the energy-recovery efficiency markedly, as shown in Table II and FIG. 9.

In some cases the solar roof structure can also be used for air-conditioning in summer, by preventing overheating of the roof. This is done by removing the calories collected, in an air-cooling chamber. This application of the invention is of considerable interest, mainly for air-conditioning of industrial premises and storage areas. It can be combined with the production of domestic or industrial hot water.

TABLE I

| Characteristics of a solar roof structure constructed in accordance with the invention | |
|---|---|
| Heat-absorbent surface area: | |
| length | 6 meters |
| width | 20 meters |
| pitch | 45° |
| orientation | facing south |
| outside surface consisting of glass balls mixed with brown ceramic particles, giving the roof a grey-brown finish. | |
| absorption factor | 0,9 |
| infra-red emissive power | 0,9 |
| Waterproofing layer: | |
| elastomer bitumen 8 mm thick. | |
| heat conductivity | 0,15 W/m$^2$/°C. |
| Circulating pipes: | |
| incorporated in rolled aluminium shetting, as illustrated in FIG. 3. | |
| thickness in sheet | 1,5 mm |
| pipe section | 2 mm × 10 mm |
| distance between pipes | 30 mm |
| thickness of pipe metal | 1 mm |
| Heat-carrying fluid: | |
| water | |
| specific heat | Cp 1 kcal/kg/°C. |
| density | p 1000 kg/m$^3$ |

Table I shows the characteristics of a prototype solar roof as described in this invention, and as illustrated in FIG. 8. The table gives the dimensions and geometrical and thermal characteristics of the roof.

Table II shows performance levels achieved at noon with this roof, in relation to the water inlet temperature, water flow-rate and weather conditions (solar energy flow and angle of incidence of sun's rays, outdoor temperatures and wind speed).

The results of Table II are shown in FIG. 9, in the form of graphs giving percentage energy-recovery efficiency values for a solar roof structure as described in this invention, in relation to a variable:

$$(\theta_a - \theta_{out})/p$$

where:
$\theta_a$ is the average water temperature inside the roof structure $(\theta_i + \theta_o)/2$, where
$\theta_i$ is the inlet temperature, and
$\theta_o$ the outlet temperature in °C.;
$\theta_{out}$ is the outdoor temperature in °C.;
P is the incident solar flux in W/m$^2$.

For comparison, the graphs for a conventional solar panel, with and without glazing, are also shown on this figure.

Graph 1 shows the efficiency of a conventional solar heating panel with glass covering, with no wind;
Graph 2 shows the efficiency of the same panel in a 5 m/s wind;
Graph 3 shows the efficiency of a solar panel without glass, in a 1 m/sec wind;
Graph 4 shows the efficiency of a solar roof structure as described in the invention, with no wind;
Graph 5 shows the efficiency of the same roof in a 1 m/sec wind;
Graph 6 shows the efficiency of the same roof in a 5 m/sec wind.

The graphs in FIG. 9, based on experimental results, suggest that:
while the solar roof structure described in this invention has a much lower energy-recovery efficiency than conventional flat solar panels using the hothouse effect, this is largely counterbalanced by the possibility of providing large energy collecting areas without any problem as regards their incorporation, and without excessive extra cost;

the sensitivity of efficiency in relation to working temperature is very high, much higher than with conventional solar heating panels, so that it becomes worthwhile working at low temperatures (using a heat pump);

sensitivity to wind is also very high, much higher than with conventional solar heating panels, so that it becomes worth while sheltering the roof and protecting its surface from the effect of wind.

As shown in FIG. 8, a four- or five-roomed house, fitted with a solar roof covered with shingles (a method already widely used and attractive in appearance), can have a solar half-roof 10, covering an area of approximately 120 m², facing south and at a pitch of 45°.

The Figures in Table II show that, operating at low temperature (15° or 20° C.), with a heat pump, the average energy-recovery efficiency, for a sunny winter's day, is between 15 and 30%, depending on weather conditions, particularly outdoor temperature and wind.

TABLE II

Effective heat recovered by the solar roof structure defined in Table I under various operating conditions.

| | Operating conditions | | Meteorological conditions | | | Results | |
|---|---|---|---|---|---|---|---|
| | Water inlet temperature (°C.) | Water circulation flow-rate (l/hr) | Solar flux (W/m²) | Angle of * incidence (degrees) | Outdoor temperature (°C.) | Wind speed (m/sec) | Effective flux recovered (W/m²) | Efficiency (%) |
| Winter | 10 | 5 000 | 750 | 15° | 0° | 1 | 350 | 47 |
| | 20 | 5 000 | 750 | 15° | 0° | 1 | 250 | 33 |
| | 30 | 5 000 | 750 | 15° | 0° | 1 | 155 | 21 |
| | 20 | 5 000 | 750 | 15° | 0° | 5 | 42 | 5,5 |
| | 20 | 5 000 | 750 | 15° | 5° | 1 | 295 | 39 |
| Spring/ Autumn | 20 | 5 000 | 850 | 0° | 10° | 1 | 400 | 47 |
| | 40 | 5 000 | 850 | 0° | 10° | 1 | 200 | 23,5 |
| | 20 | 5 000 | 850 | 0° | 10° | 5 | 220 | 26 |
| | 20 | 5 000 | 400 | 0° | 10° | 5 | 30 | 7,5 |
| Summer | 40 | 5 000 | 800 | 20° | 25° | 2 | 250 | 31 |
| | 60 | 5 000 | 800 | 20° | 25° | 2 | 16 | 2 |
| | 40 | 10 000 | 800 | 20° | 25° | 2 | 265 | 33 |
| | 40 | 5 000 | 400 | 20° | 25° | 2 | 42 | 10,5 |

* Angle made by sun's rays with the perpendicular of the roof

Where such a house is situated in the Mediterranean coastal area, a roof like this supplies between 12,000 and 25,000 kWh for heating purposes during the winter (October to April). The needs of such a house, which are approximately 15,000 to 20,000 kWh, can easily be met, with the extra kWh provided by the heat pump.

The process described here offers average solar energy-recovery or collecting efficiency of approximately 15 to 30%, defined as the ratio of the calorific energy recovered in W/m² to the incident solar energy in W/m².

Solar roof structures with circulating liquid can therefore meet most if not all the heating requirements, without altering the architectural appearance of the house, and with much lower capital cost than for conventional solar heating installations.

The solar heating systems can be used for individual private houses and, in general, for residential buildings.

They can also be used to produce domestic hot water for communal buildings or to heat premises such as hangars, warehouses or factories, which already make extensive use of bituminous shingles for roofing and waterproofing purposes.

Another field of application is the heating and air-conditioning of caravans and mobile homes or building site huts. In all these areas, since water is used as the heat-carrying fluid, production of domestic hot water is possible.

Finally, one important use of the system described above is for air-conditioning combined with prevention of overheating of roofs and roof-spaces, particularly in the case of warehouses and factories.

Naturally, this invention is in no way confined to the embodiments described above: many variant forms are possible for semeone skilled in the art, depending on applications, and without any departure from the spirit of the invention.

What is claimed is:

1. A solar roofing structure combining the covering and waterproofing functions of a conventional roof with the functions of a solar energy-collecting panel, which can be used to heat or air-condition the premises it covers, and which comprises:
    a supporting base;
    a layer of insulating material on said base;
    waterproofing cover means of a material selected from the group consisting of elastomers and bitumen, the outer surface of which is covered on its upper surface with mineral particles selected from the group consisting of gravel, glass and ceramic particles; and
    means separate from said waterproofing cover means defining circulation channels for a liquid, in close contact with and below the waterproofing cover means, and between said waterproofing cover means and the insulating material and in contact with each.

2. A structure as defined in claim 1, wherein the water pipes form part of a sheet or plate of metal, in contact with the waterproofing layer.

3. A structure as defined in claim 2, wherein the water pipes are tubular conduits incorporated in an aluminium sheet, in close contact with the waterproofing cover means.

4. A structure as defined in claim 2, wherein the water pipes are an integral part of the metal sheet, produced by extrusion.

* * * * *